(12) United States Patent
Schaake

(10) Patent No.: US 11,597,253 B2
(45) Date of Patent: Mar. 7, 2023

(54) BLOWER COMPRISING A MOTOR MOUNT

(71) Applicant: MAHLE International GmbH, Stuttgart (DE)

(72) Inventor: Norman Schaake, Markgroeningen (DE)

(73) Assignee: MAHLE International GmbH, Stuttgart (DE)

( * ) Notice: Subject to any disclaimer, the term of this patent is extended or adjusted under 35 U.S.C. 154(b) by 486 days.

(21) Appl. No.: 16/579,903

(22) Filed: Sep. 24, 2019

(65) Prior Publication Data

US 2020/0094648 A1 Mar. 26, 2020

(30) Foreign Application Priority Data

Sep. 24, 2018 (DE) ..................... 10 2018 216 193.3

(51) Int. Cl.
*B60H 1/00* (2006.01)
*F04D 29/60* (2006.01)
*F04D 25/06* (2006.01)

(52) U.S. Cl.
CPC ......... *B60H 1/00521* (2013.01); *F04D 25/06* (2013.01); *F04D 29/601* (2013.01); *B60H 2001/006* (2013.01)

(58) Field of Classification Search
CPC ............ B60H 1/00471; B60H 1/00521; B60H 2001/006; F04D 25/06; F04D 25/0606; F04D 29/162; F04D 29/601; F04D 29/626; F04D 29/667
See application file for complete search history.

(56) References Cited

U.S. PATENT DOCUMENTS

| 10,288,077 B2 | 5/2019 | Motomura |
| 2012/0207631 A1 | 8/2012 | Lehmann |
| 2012/0315135 A1 | 12/2012 | Sato et al. |
| 2015/0118054 A1 | 4/2015 | Zerelles |

FOREIGN PATENT DOCUMENTS

| CN | 204253391 U | 4/2015 |
| CN | 106164498 A | 11/2016 |
| CN | 207349128 U | 5/2018 |
| DE | 102013222207 A1 | 4/2015 |
| DE | 102015116350 A1 | 3/2017 |
| JP | 2003276420 A | 9/2003 |

*Primary Examiner* — Grant Moubry
*Assistant Examiner* — Ruben Picon-Feliciano
(74) *Attorney, Agent, or Firm* — Muncy, Geissler, Olds & Lowe, P.C.

(57) ABSTRACT

A blower having a motor mount, in particular for a blower of an air-conditioning system of a motor vehicle, the blower having a blower housing, in which an electric motor is held with the aid of the motor mount, an impeller being furthermore drivably disposed in the blower housing on a shaft of the electric motor, the impeller having a side oriented toward the electric motor, and the motor mount having a first surface oriented toward the impeller, a gap being formed between the impeller and the first surface, the first surface having a plurality of first projecting elements, which protect on the outer circumference of the surface in the direction of the impeller.

10 Claims, 2 Drawing Sheets they project toward the impeller. The
BLOWER COMPRISING A MOTOR MOUNT

This nonprovisional application claims priority under 35 U.S.C. § 119(a) to German Patent Application No. 10 2018 216 193.3, which was filed in Germany on Sep. 24, 2018, and which is herein incorporated by reference

BACKGROUND OF THE INVENTION

Field of the Invention

The present invention relates to a blower comprising a motor mount, in particular for a blower of an air-conditioning system of a motor vehicle.

Description of the Background Art

Air-conditioning systems for motor vehicles have blowers, with the aid of which an air flow is generated, which is thermally conditioned and possibly dehumidified in the air-conditioning unit of the air-conditioning system with the aid of heat exchangers to subsequently be discharged into the interior of the motor vehicle.

For this purpose, the blower has an electric motor, which drives an impeller, which is accommodated on the shaft of the electric motor and may be driven by the electric motor.

The blower housing has a motor mount for receiving and holding purposes, which at least partially surrounds the electric motor by an essentially circumferential wall for the purpose of gripping or supporting it. The motor mount also has a surface projecting from this wall, which is disposed opposite the impeller and forms a gap with the impeller.

It has become apparent that tonal noise components form during the operation of the blower, which have proven to be bothersome.

SUMMARY OF THE INVENTION

It is therefore an object of the present invention to provide a blower, which comprises a motor mount and which is improved with regard to undesirable noise.

DE 10 2013 222 207, which corresponds to US 2015/0118054, which is incorporated herein by reference, discloses a radial blower.

An exemplary embodiment of the invention relates to a blower comprising a motor mount, in particular for a blower of an air-conditioning system of a motor vehicle, the blower having a blower housing, in which an electric motor is held with the aid of the motor mount, an impeller being furthermore drivably disposed in the blower housing on a shaft of the electric motor, the impeller having an end face oriented toward the electric motor, and the motor mount having a first surface oriented toward the impeller, a gap being formed between the impeller and the first surface, the first surface having a plurality of first projecting elements, which protect on the outer circumference of the surface in the direction of the impeller. This achieves the fact that air flowing through the gap between the impeller and the motor mount is disturbed by the projecting elements in such a way that tonal noise components occurring elsewhere are impaired and damped in terms of their volume.

The first surface can be designed as an annular surface. This achieves the fact that the gap may be provided with projecting elements of the motor mount over its entire circumference, so that circumferential air flows in the gap may also be disturbed and thus damped.

The first surface can be a surface of an annular flange. It may thus be achieved that the projecting elements may be manufactured, for example by stamping a metal sheet or by injection-molding from plastic.

A second surface can be provided opposite the first surface, from which two second projecting elements project, which project in the direction away from the impeller. The first surface and the second surface are, for example, two opposite surfaces of the annular flange.

The first projecting elements and/or the second projecting elements can be designed as essentially hemispherical elements or essentially sphere segment elements or essentially cylindrical pin having an essentially hemispherical end or the like. The individual first projecting elements and/or second projecting elements may be provided with different designs in such a way that different types of elements of this type are provided in each case. A suitable arrangement of identical or different projecting elements may be provided thereby, which are disposed to reduce or damp tonal noise.

The first projecting elements and/or the second projecting element can be provided with a varied or identical design in their projecting height and/or in their diameter. An effective design for damping tonal noise can also be achieved thereby.

The first projecting elements projecting toward the impeller can be disposed in circumferential rows and/or are disposed in a somewhat randomly distributed manner over the circumference, and/or that the second projecting elements projecting away from the impeller are disposed in circumferential rows and/or are disposed in a somewhat randomly distributed manner over the circumference. The noise damping is advantageously influenced thereby.

The first projecting elements can be arranged in a first annular area of the motor mount, and the second projecting elements are arranged in a second annular area of the motor mount, the first projecting elements being arranged radially on the outside, and the second projecting elements being arranged radially on the inside. An advantageous distribution of the projecting elements is achieved thereby for advantageous noise damping.

The first projecting elements can be arranged essentially in the radial area of the outer radius of the impeller. Excitations to tonal noise through or on the outer edge of the impeller are reduced thereby.

The first projecting elements can penetrate the gap, while a residual gap still remains between the end of the first projecting elements and the impeller. This achieves the fact that the noise damping is effective, while the impeller is easily accessible.

The impeller can have a blade system on the end face oriented toward the motor mount, whose blades project toward the motor mount and toward the first projecting elements.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
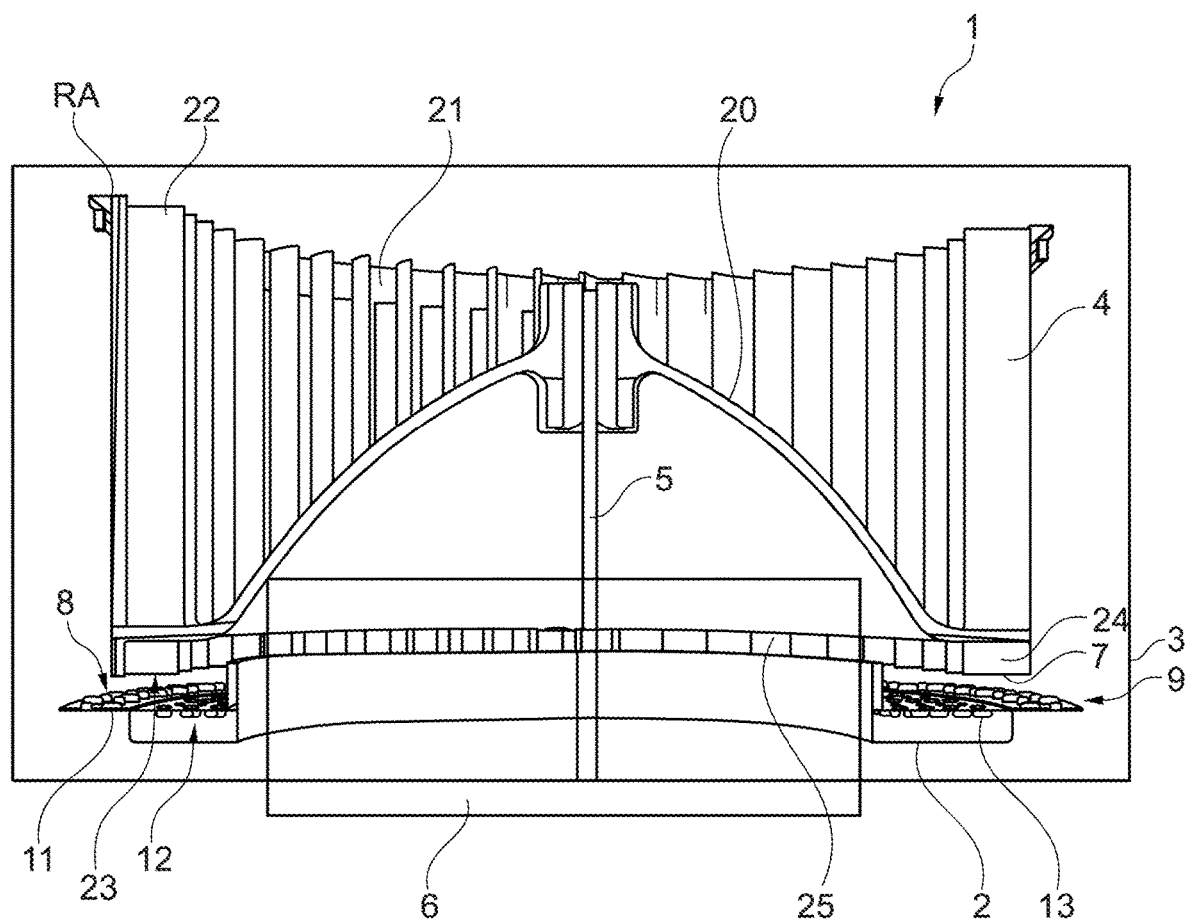
FIG. 1 shows a sectional representation of a motor mount, including an impeller.

FIG. 1 schematically shows a view of a blower 1 comprising a motor mount 2, in particular for a blower of an air-conditioning system of a motor vehicle.

Blower 1 has a blower housing 3 for this purpose, including an air inlet, which is not illustrated, and an air outlet. An impeller 4 is accommodated in blower housing 3, which is drivably accommodated on a shaft 5 of an electric motor 6 as a blower motor, to be able to place impeller 4 in rotation for the purpose of generating the desired air flow of blower 1. Impeller 4 is driven to rotation by electric motor 6.

Electric motor 6 is held with the aid of motor mount 2 of blower housing 3.

Impeller 4 has a side 7 oriented toward electric motor 6, and motor mount 2 has a first surface 8 oriented toward impeller 4.

A gap 9 is formed between impeller 4 and first surface 8.

Figure 2:
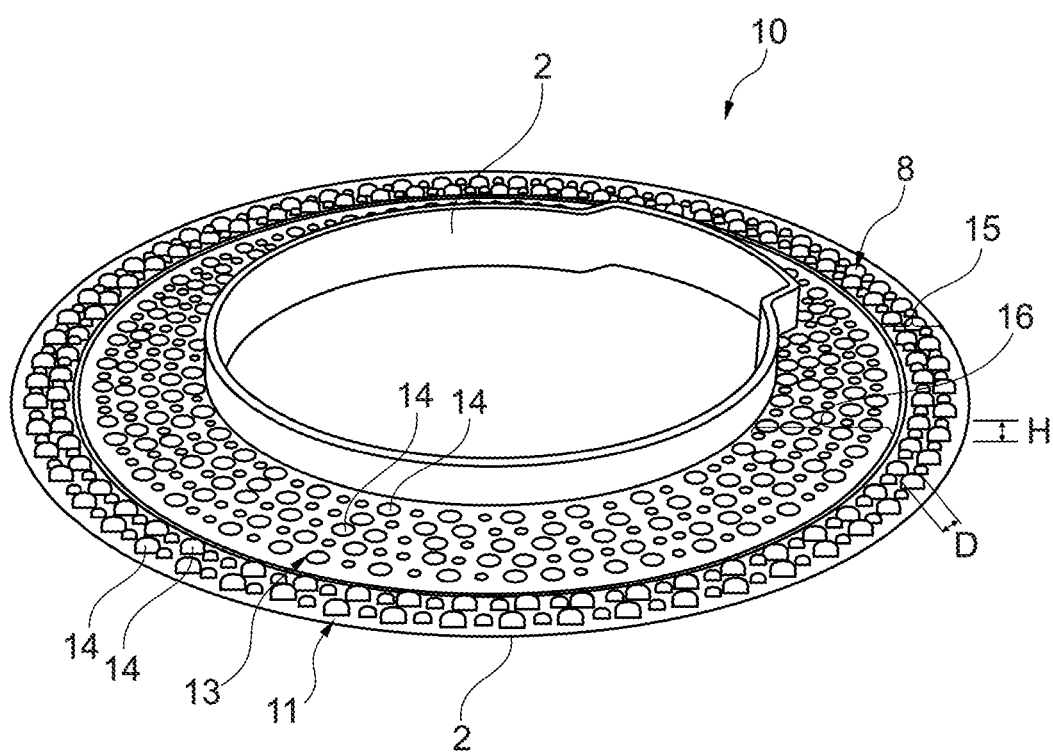
FIG. 2 shows a perspective representation of a surface of a motor mount.

FIGS. 1 and 2 shows that first surface 8 of motor mount 2 is designed as an annular surface, first surface 8 being, in particular, a surface of an annular flange 10; cf. FIG. 2.

FIGS. 1 and 2 show that first surface 8 has a plurality of first projecting elements 11, which project on the outer circumference of first surface 8 in the direction of impeller 4.

It is also apparent that a second surface 12 is provided opposite first surface 8, from which second projecting elements 13 project, which project in the direction away from impeller 4.

FIGS. 1 and 2 show that first projecting elements 11 and/or second projecting elements 13 are designed as hemispherical elements or sphere segment elements or as cylindrical pins having a hemispherical end or the like.

First projecting elements 11 and/or second projecting elements 13 are designed in such a way that they have a varied or identical design in their projecting height H and/or in their diameter D.

It is apparent from FIG. 2 that the first projecting elements 11 projecting toward impeller 4 are arranged in circumferential rows 14 and/or are arranged in a somewhat randomly distributed manner over the circumference, and/or that second projecting elements 13 projecting away from impeller 4 are arranged in circumferential rows 14 and/or are arranged in a somewhat randomly distributed manner over the circumference.

It is also apparent from FIG. 2 that first projecting elements 11 are arranged in a first annular area 15 of motor mount 2, and second projecting elements 13 are arranged in a second annular area 16 of motor mount 2, first projecting elements 11 being arranged radially on the outside, and second projecting elements 13 being arranged radially on the inside.

FIG. 1 shows that first projecting elements 11 are arranged essentially in the radial area of outer radius RA of impeller 4.

It is also apparent that first projecting elements 11 penetrate gap 9, while a residual gap still remains between the end of first projecting elements 11 and impeller 4.

According to another aspect, impeller 4 is designed in such a way that it has a first flange 20 and a second flange 21, blower blade elements 22 being connected to these two flanges 20, 21. Impeller 4 furthermore optionally has a blade system 24 on end face 23 oriented in the direction of motor mount 2, whose blades 25 project toward motor mount 2 and toward first projecting elements 11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A blower comprising:
a motor mount for a blower of an air-conditioning system of a motor vehicle;
a blower housing in which an electric motor is held via the motor mount;
an impeller being drivably disposed in the blower housing on a shaft of the electric motor, the impeller having a side oriented toward the electric motor, and the motor mount having a first surface that faces toward the impeller and a second surface that faces away from the impeller, such that the first surface and the second surface face opposing directions from each other with respect to an axial direction of the shaft; and
a gap formed between the impeller and the first surface, wherein the first surface has a plurality of first projecting elements that project from the first surface in a direction toward the impeller, and the second surface has a plurality of second projecting elements that project from the second surface in a direction away from the impeller, such that the plurality of first projecting elements and the plurality of second projecting elements project in opposing directions from each other with respect to the axial direction of the shaft.

2. The blower according to claim 1, wherein the first surface is an annular surface.

3. The blower according to claim 1, wherein the first surface is a surface of an annular flange.

4. The blower according to claim 1, wherein the first projecting elements and/or second projecting elements are designed as hemispherical elements or sphere segment elements or as cylindrical pins having a hemispherical end.

5. The blower according to claim 1, wherein the first projecting elements and/or the second projecting elements are provided with a varied or identical design with respect to a projecting height and/or a diameter.

6. The blower according to claim 1, wherein the first projecting elements projecting toward the impeller are arranged in circumferential rows and/or are arranged in a randomly distributed manner, and/or wherein the second projecting elements projecting away from the impeller are arranged in circumferential rows and/or are arranged in a randomly distributed manner.

7. The blower according to claim 1, wherein the first projecting elements are arranged in a first annular area of the motor mount and the second projecting elements are arranged in a second annular area of the motor mount, and wherein the first annular area is arranged radially on an outside of the first surface of the motor mount, and the second annular area is arranged radially on an inside of the second surface of the motor mount.

8. The blower according to claim 1, wherein the first projecting elements are arranged in a radial area of an outer radius of the impeller.

9. The blower according to claim 1, wherein the first projecting elements penetrate the gap, while a residual gap still remains between an end of each of the first projecting elements and the impeller.

10. The blower according to claim 1, wherein the impeller has a blade system on an end face oriented toward the motor mount, and wherein blades of the blade system project toward the motor mount and toward the first projecting elements.

\* \* \* \* \*